United States Patent [19]
Lustre

[11] Patent Number: 5,971,318
[45] Date of Patent: Oct. 26, 1999

[54] SAFETY SYSTEM FOR VISUAL FLIGHT REFERENCES SYSTEM

[76] Inventor: Tony Lustre, 5470 S. Greenwood, Chicago, Ill. 60615-5104

[21] Appl. No.: 08/800,615

[22] Filed: Feb. 14, 1997

[51] Int. Cl.$^6$ .................................................... A47B 19/00
[52] U.S. Cl. ...................... 244/1 R; 244/118.1; 244/121; 244/129.1; 244/118.5; 244/119; 701/3; 701/14; 701/16; 701/206; 180/321; 180/322; 180/325
[58] Field of Search ................... 701/3, 14, 16, 701/206; 244/1 R, 118.1, 121, 118.5, 119; 180/321, 322, 325

[56] References Cited

U.S. PATENT DOCUMENTS

| | | | |
|---|---|---|---|
| 5,222,690 | 6/1993 | Jeffords | 244/1 |
| 5,774,818 | 6/1998 | Pages | 701/3 |

*Primary Examiner*—William A. Cuchlinski, Jr.
*Assistant Examiner*—Olga Hernandez

[57] ABSTRACT

A safety system for visual flight reference system for simulating the geography around an airplane during the landing and the take-off under zero visibility conditions. The inventive device includes a display screen, a keyboard, a hold-down bracket and a central processing unit.

4 Claims, 3 Drawing Sheets

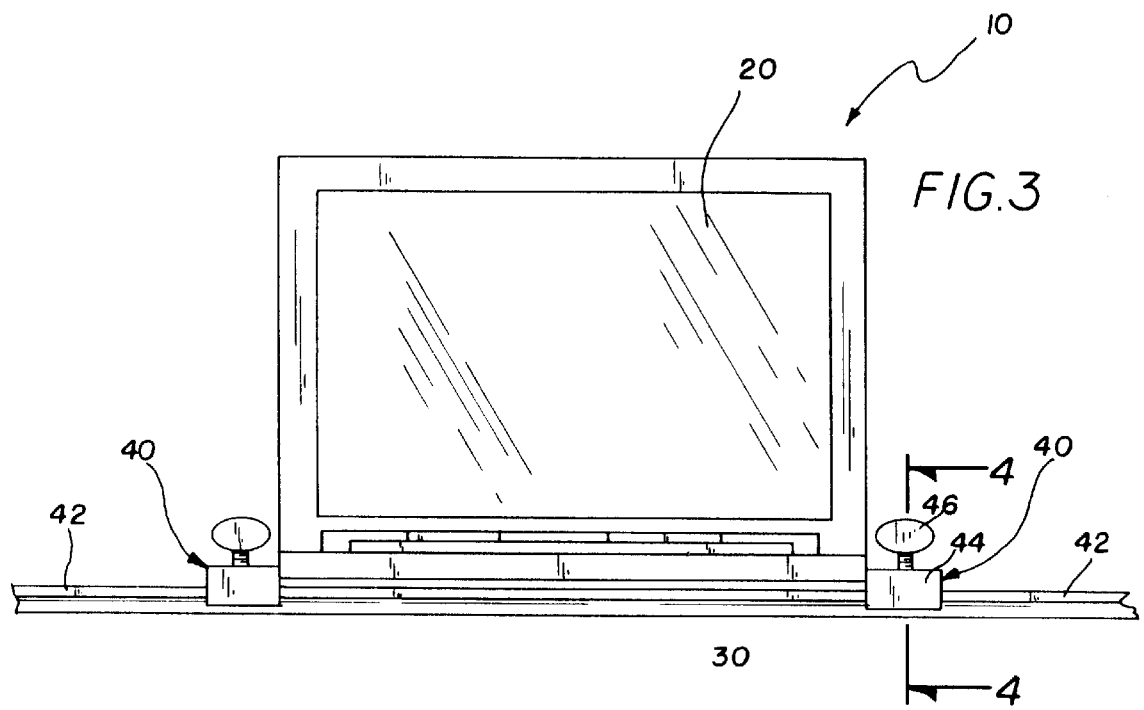
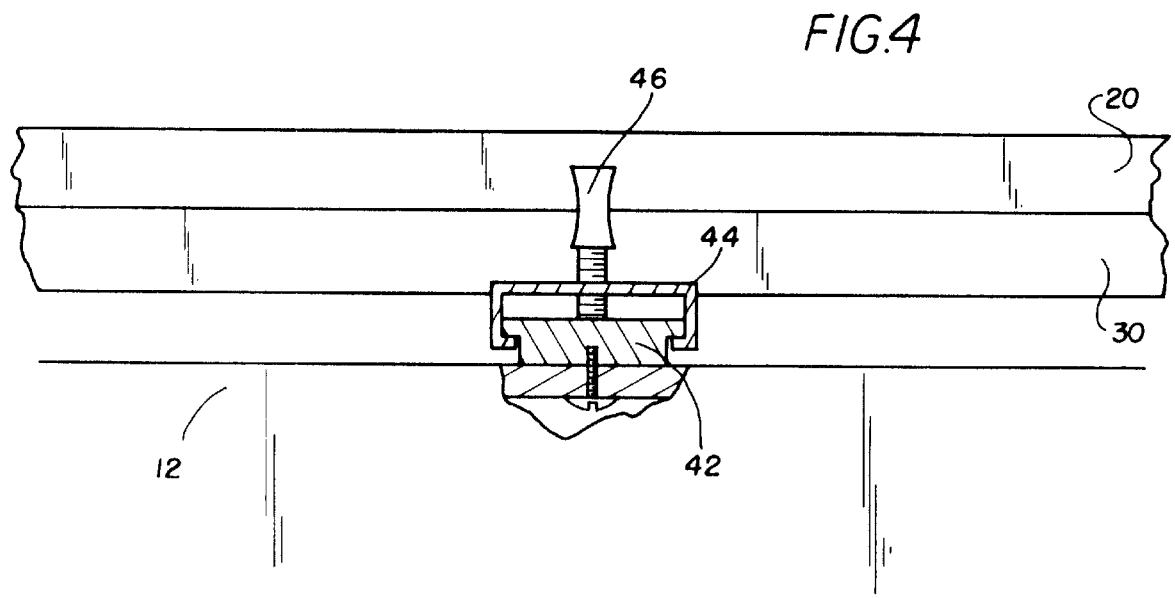

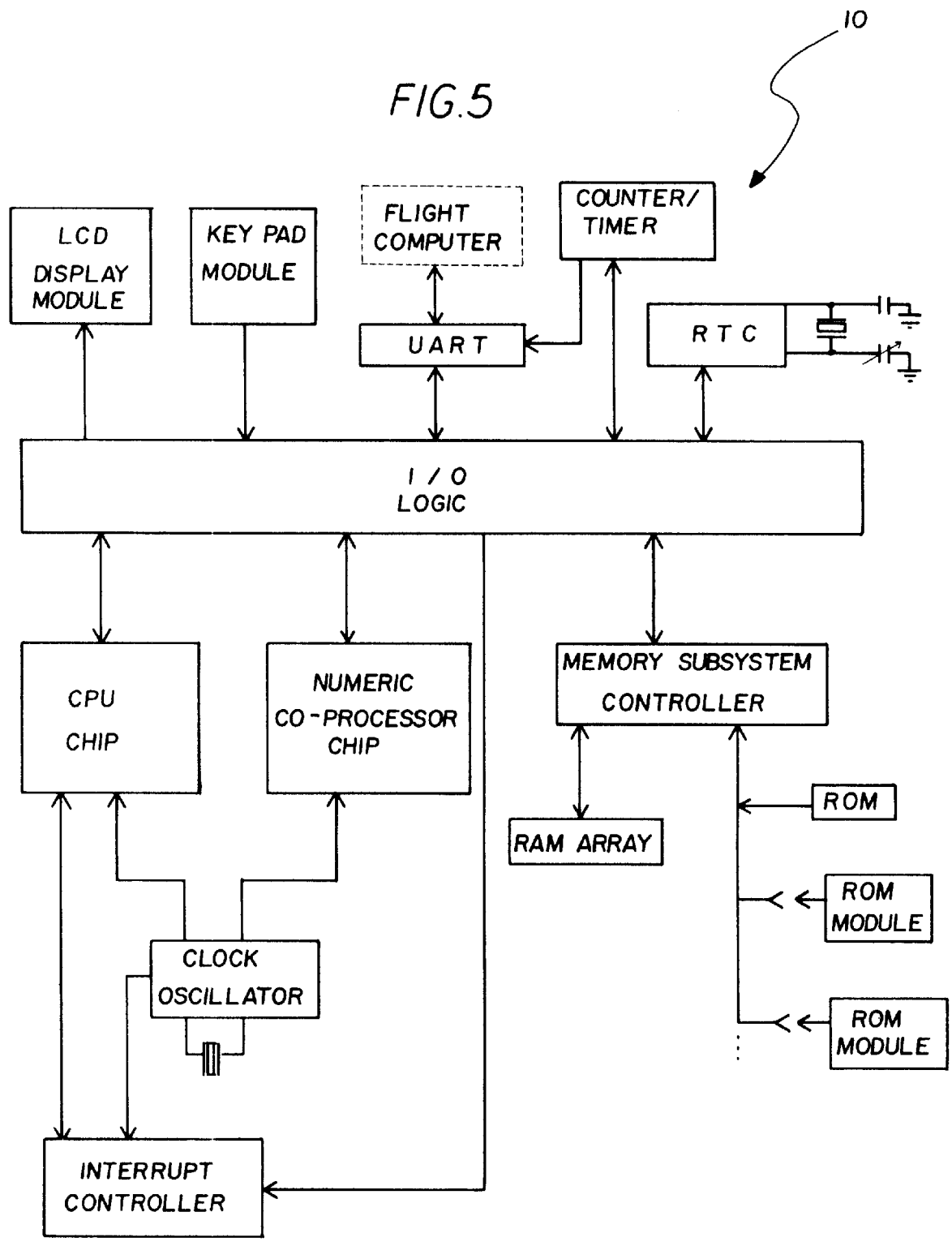

SAFETY SYSTEM FOR VISUAL FLIGHT REFERENCES SYSTEM

BACKGROUND OF THE INVENTION

1. Field of the Invention

The present invention relates to Flight Simulating Devices and more particularly pertains to a new safety system for visual flight references system for simulating the geography around the landing and the take-off of an airplane during zero visibility conditions thereby allowing the pilot to visualize the surrounding landscape.

2. Description of the Prior Art

The use of Flight Simulating Devices is known in the prior art. More specifically, Flight Simulating Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Flight Simulating Devices include U.S. Pat. No. 5,272,652; U.S. Pat. No. 5,009,598; U.S. Pat. No. 5,394,517; U.S. Pat. No. 4,419,079; U.S. Pat. No. 4,179,823 and U.S. Pat. No. 4,645,459.

While these devices fulfill their respective, particular objectives and requirements, the aforementioned patents do not disclose a new safety system for Visual Flight Reference System. The inventive device includes a display screen, a keyboard, a hold-down bracket and a central processing unit.

In these respects, the safety system for visual flight reference system according to the present invention substantially departs from the conventional concepts and designs of the prior art, and in so doing provides an apparatus primarily developed for the purpose of simulating the geography around the landing and the take-off of an airplane during zero visibility conditions thereby allowing the pilot to visualize the surrounding landscape.

SUMMARY OF THE INVENTION

In view of the foregoing disadvantages inherent in the known types of Flight Simulating Devices now present in the prior art, the present invention provides a new safety system for visual flight references system construction wherein the same can be utilized for simulating the geography around the landing and the take-off of an airplane during zero visibility conditions thereby allowing the pilot to visualize the surrounding landscape.

The general purpose of the present invention, which will be described subsequently in greater detail, is to provide a new safety system for visual flight references system apparatus and method which has many of the advantages of the Flight Simulating Devices mentioned heretofore and many novel features that result in a new safety system for visual flight references system which is not anticipated, rendered obvious, suggested, or even implied by any of the prior art Flight Simulating Devices, either alone or in any combination thereof.

To attain this, the present invention generally comprises a display screen, a keyboard, a hold-down bracket and a central processing unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new safety system for visual flight references system apparatus and method which has many of the advantages of the Flight mentioned heretofore and many novel features that result in a new safety system for visual flight references system Flight Reference System which is not anticipated, rendered obvious, suggested, or even implied by any of the prior art Flight Simulating Devices, either alone or in any combination thereof.

It is another object of the present invention to provide a new safety system for visual flight references system which may be easily and efficiently manufactured and marketed.

It is a further object of the present invention to provide a new safety system for visual flight references system which is of a durable and reliable construction.

An even further object of the present invention is to provide a new safety system for visual flight references system which is susceptible of a low cost of manufacture with regard to both materials and labor, and which accordingly is then susceptible of low prices of sale to the consuming public, thereby making such safety system for visual flight reference system economically available to the buying public.

Still yet another object of the present invention is to provide a new safety system for visual flight references system which provides in the apparatuses and methods of the prior art some of the advantages thereof, while simultaneously overcoming some of the disadvantages normally associated therewith.

Still another object of the present invention is to provide a new safety system for visual flight references system for simulating the geography around the landing and the take-off of an airplane during zero visibility conditions thereby allowing the pilot to visualize the surrounding landscape.

Yet another object of the present invention is to provide a new safety system for visual flight references system which includes a display screen, a keyboard, a hold-down bracket and a central processing unit.

Still yet another object of the present invention is to provide a new safety system for visual flight references system that provides increased accurate landings and take-offs by adapting to undesirable weather conditions.

Even still another object of the present invention is to provide a new safety system for visual flight references system that simulates the surrounding geography without the current undesirable weather conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of the present invention.

FIG. 4 is a cross sectional view taken along line 4—4 of FIG. 3.

FIG. 5 is a schematic illustration of the present invention.

DESCRIPTION OF THE PREFERRED EMBODIMENT

Figure 1:
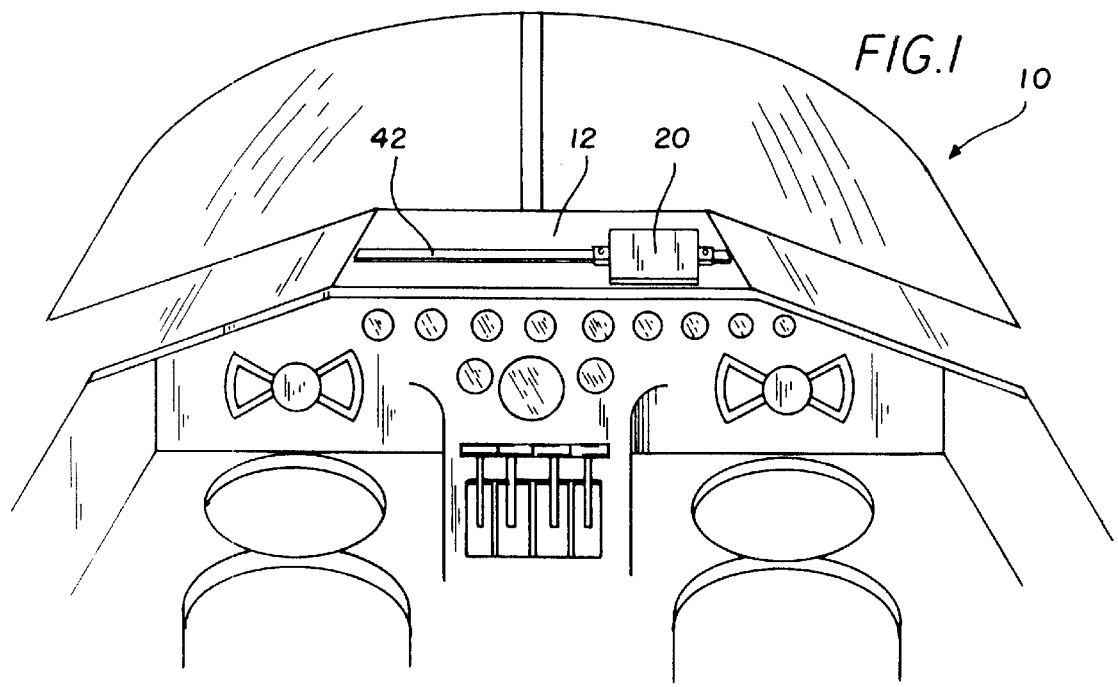
FIG. 1 is an upper front view of a new Visual Flight Reference System according to the present invention.
Figure 2:
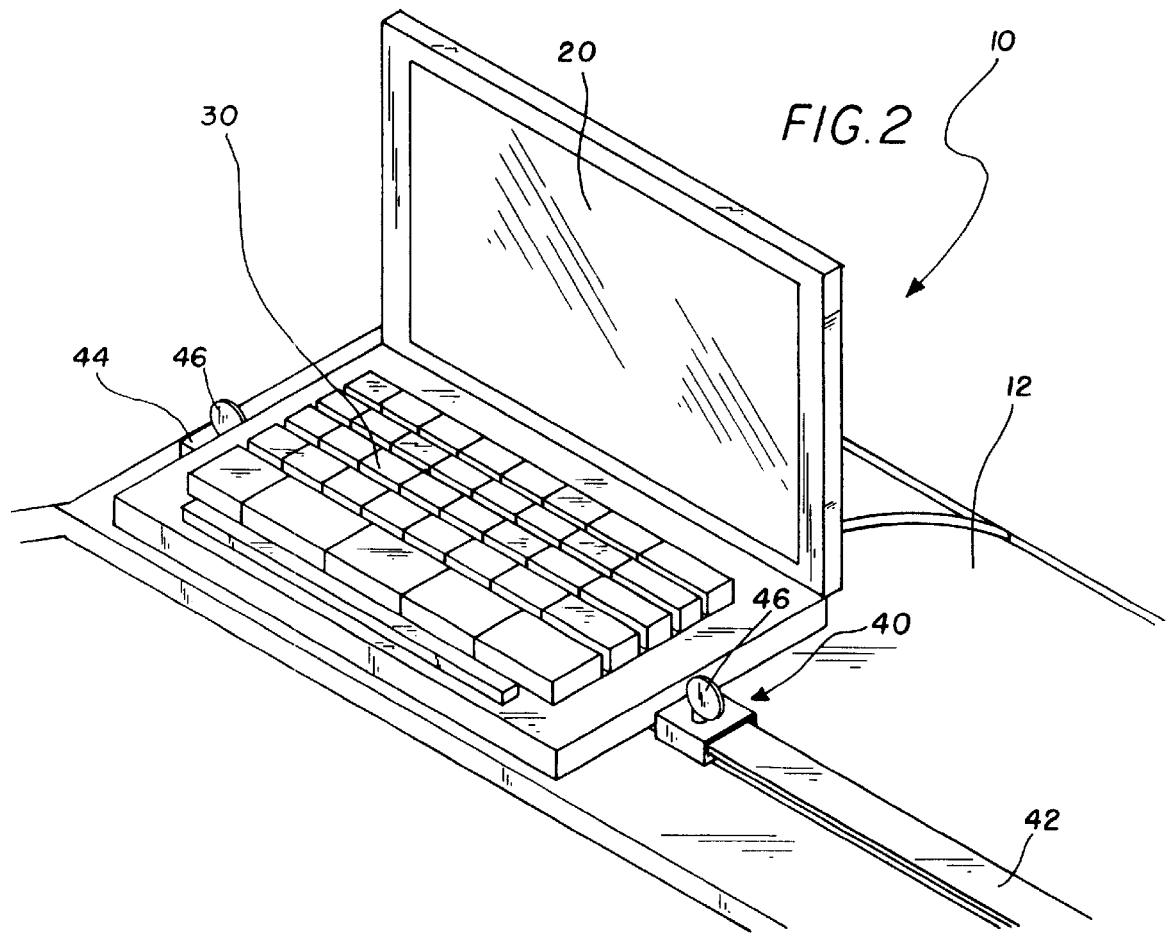
FIG. 2 is an upper perspective view of the present invention.

With reference now to the drawings, and in particular to FIGS. 1 through 5 thereof, a new Visual Flight Reference System embodying the principles and concepts of the present invention and generally designated by the reference numeral 10 will be described.

More specifically, it will be noted that the Visual Flight Reference system 10 comprises a central processing unit electrically connected to a plurality of instruments within an airplane and constantly reading the instruments, a keyboard 30 electrically connected to the central processing unit allowing a pilot to enter information into the central processing unit, and a display screen 20 pivotally attached to the keyboard 30 and electrically connected to the central processing unit to display to the pilot a surrounding geography without undesirable weather conditions present to interfere with the pilot's vision.

As shown in FIGS. 1 through 4, a hold-down bracket 40 is provided for adjustably securing the keyboard 30 to a dash 12 within the airplane. The hold-down bracket 40 comprises a T-rail 42 secured to the dash 12 traversely to a longitudinal axis of the airplane. A pair of C-brackets 44 are secured to opposite sides of the keyboard 30 and slidably engaging the T-rail 42. A pair of winged end screws 46 are threadably projecting through the pair of C-brackets 44 for tightening the C-bracket 44 to the T-rail 42 for preventing movement of the keyboard 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A safety system for visual flight references system for mounting to a dash of an airplane having a pair of controls, the safety system comprising:

a central processing unit electrically connected to a plurality of instruments within an airplane and constantly reading said instruments;

a keyboard electrically connected to said central processing unit allowing a pilot to enter information into said central processing unit;

a display screen pivotally attached to said keyboard and electrically connected to said central processing unit to display to said pilot a surrounding geography without undesirable weather conditions present to interfere with said pilot's vision; and wherein said keyboard is positionable between horizontal planes extending through pivot axes of steering yokes of said airplane.

2. The safety system of claim 1, including a hold-down bracket for adjustably securing said keyboard to a dash within said airplane.

3. The safety system of claim 2, wherein said hold-down bracket comprises:

a T-rail secured to said dash traversely to a longitudinal axis of said airplane;

a pair of C-brackets secured to opposite sides of said keyboard and slidably engaging said T-rail; and a pair of winged end screws threadably projecting through said pair of C-brackets for tightening said C-bracket to said T-rail for preventing movement of said keyboard.

4. A safety system for visual flight references system comprising:

an airplane having a cockpit having a dash and control panel, said control panel having two sets of controls including a pair of steering yokes;

a central processing unit electrically connected to a plurality of instruments of an airplane and constantly reading said instruments;

a keyboard electrically connected to said central processing unit allowing a pilot to enter information into said central processing unit;

a display screen pivotally attached to said keyboard and electrically connected to said central processing unit to display to said pilot a surrounding geography without undesirable weather conditions present to interfere with said pilot's vision;

a hold-down bracket for adjustably securing said keyboard to said dash of said airplane, wherein said keyboard is positionable between horizontal planes extending through pivot axes of said yokes;

a T-rail secured to said dash traversely to a longitudinal axis of said airplane;

a pair of C-brackets secured to opposite sides of said keyboard and slidably engaging said T-rail such that said keyboard is positionable along said T-rail;

wherein a length of said T-rail is defined between opposite ends thereof, said length of said T-rail being less than a distance between horizontal planes extending through pivot axes of said steering yokes; and a pair of winged end screws threadably projecting through said pair of C-brackets for tightening said C-bracket to said T-rail for preventing movement of said keyboard.

* * * * *